United States Patent [19]

Katoen et al.

[11] Patent Number: 5,594,733
[45] Date of Patent: Jan. 14, 1997

[54] MULTI-STATION BUS SYSTEM HAVING MEANS FOR POLLING AND UPDATING OF GLOBALLY RELEVANT INFORMATION, IN PARTICULAR A STATION ADDRESS, AND STATION FOR USE IN SUCH SYSTEM

[75] Inventors: Joost-Pieter Katoen; Marnix C. Vlot, both of Eindhoven, Netherlands

[73] Assignee: U.S. Philips Corporation, New York, N.Y.

[21] Appl. No.: 943,368

[22] Filed: Sep. 10, 1992

[30] Foreign Application Priority Data

Sep. 10, 1991 [EP] European Pat. Off. ............. 91202304

[51] Int. Cl.⁶ ................................................ H04L 12/403
[52] U.S. Cl. .......................... 370/449; 370/410; 370/503
[58] Field of Search ................... 370/85.8, 85.1, 370/85.5, 85.12, 95.1, 95.2, 95.3, 94.1, 94.2, 94.3, 60, 60.1, 100.1, 105.1, 105.4, 105.5, 107, 108, 110.1, 85.2, 85.3; 340/825.5, 825.51, 825.06, 825.07, 825.08; 375/354, 355, 356, 359, 365, 366

[56] References Cited

U.S. PATENT DOCUMENTS 4,387,458  6/1983  Carbrey ............................. 370/85.12
4,608,685  8/1986  Jain et al. .......................... 370/85.8
4,814,974  3/1989  Narayanan et al. ................ 370/85.2
5,177,739  1/1993  Basnuevo et al. ................. 370/85.8

FOREIGN PATENT DOCUMENTS 8900717  10/1989  Netherlands .

OTHER PUBLICATIONS

"Single Chips 8–Bit Microcontrollers", User Manual 1988, Philips Electronic Components and Materials Division.

*Primary Examiner*—Douglas W. Olms
*Assistant Examiner*—Dang Ton
*Attorney, Agent, or Firm*—Laurie E. Gathman

[57] ABSTRACT

A communication system has multiple and uniformly weighted station interconnected by a shared digital bus. A particular station comprises globally relevant information, and, with a predetermined maximum recurrence time, transmits a data packet representing such item to any other interested station. If unanimous counter signalization occurs, the item is in order, other wise updating thereof is undertaken. The unanimity is either by positive signalization, or by default.

20 Claims, 2 Drawing Sheets

200
MULTI-STATION BUS SYSTEM HAVING MEANS FOR POLLING AND UPDATING OF GLOBALLY RELEVANT INFORMATION, IN PARTICULAR A STATION ADDRESS, AND STATION FOR USE IN SUCH SYSTEM

FIELD OF THE INVENTION

The invention relates to a communication system having multiple and uniformly weighted stations that are interconnected by a shared digital bus. Such systems are in general use. Uniformly-weighted is understood as meaning that there is no single station present that acts as overall controller of the bus interactions. On the level of a single transfer, a first station may operate as a master, whereas one or more second stations would operate as slaves. A subsequent transfer could then have a different master station. Moreover, the stations can have various different priority levels, activity frequencies, and hardware provisions. The bus as referred to supra is metaphoric for its medium, that is it may be single—(that is the bus at any time has only a single data value) or plural channel, galvanically interconnected, optical, radio broadcast, infrared, or other. The bus medium may be uniform or mixed, such as a wired interconnection, that has a two-way station for external communication of infrared signals. The organization may have provisions for AND-ing/OR-ing logical states generated by the bus-connected stations. In other organizations, such provision would be irrelevant. There are various uses for this bus system including home based systems for audio/video entertainment, home-environmental control (lighting, temperature, humidity), devices for executing household chores, telecommunication, safety control, and others. A particular hazard of such a system is the low degree of organizational consistency on the level of the stations themselves, as exemplified by:

a particular station may be temporarily deactivated because it is unplugged from the bus, switched-off an associated main switch, by its main plug is disconnected, etc. Of course, the bus' physical transport layer should be immune against such disruption, but higher protocol levels would at any rate be influenced;

a particular message could go astray, which in particular could occur in case of an infrared or broadcast medium. This could cause various levels of inconsistency, in that certain stations could receive information that differs from other stations' information, or could even be totally absent;

at arbitrary instants, the bus system could become connected to another bus system. Even if at each level of the separate bus system, consistency would prevail, such need no longer be the case on the level of the composite system.

SUMMARY OF THE INVENTION

Amongst other things, it is an object in the present invention to solve in particular, but not limited to home systems, the above inconsistency problems in a convenient, consistent and unencumbering manner. According to one of the invention's aspects, a particular station comprising a globally relevant information item transmits, recurrently with a predetermined maximum recurrence interval, a data packet representing such information item for unanimous counter signalization thereto by at least a relevant subset of actually interconnected stations thereto, but upon absence of such unanimous counter signalization the particular station initiates an updating action with respect to its own relevant information item. In particular, the originating station does not address the stations of the relevant subset, as the originating station may not know which stations are actually present in the subset but rather it would only know that a station which should have joined in the unanimous counter signalization, did not. If a unanimous counter signalization is not obtained then it means that the originally transmitting station's information was outdated or otherwise erroneous. Thereupon, the original station begins updating. The unanimous counter signalization indicates, that all other stations are in unison about the original information item. In this way, the original station need not poll each station regarding the correctness of an information item. The original station instead puts the information item on the bus and if the original station does not receive a signal which indicates that the other stations are in unanimous agreement that the information item is correct then the original station will update or change the value of the information item there may be various physical representations of the unanimity, such as by using a wired-OR (a -one- signal could in particular circumstances signal a discord), or wired-AND. The counter signalization could be a message, wherein the set of messages generated would indicate unanimity or otherwise. In this respect, all messages could indeed contain identical signalization items, whereupon the original station would check the unanimity. According to another solution, any such message could, on a suitable communication layer, such as bit, word, or other, by its occurrence alone, signal lack of unanimity. Furthermore, the original station need not always transfer the item itself, as an indirect indication, abstract, or other representation would suffice. It is not strictly necessary that all other stations connected should actually have the facility for counter signaling. Certain stations could be slave-only stations. Alternatively, a station may be too busy to answer and if it did not concur with the unanimity, it could signal so upon the end of the next recurrence interval. Various other reasons could put a particular station out of the relevant subset specified above.

According to a particular advantageous aspect of the invention, the globally relevant information is an address of the particular station itself. Generally, such addresses should be unique, and the updating would take care of making the address unique again. Many things could cause two or even more stations to have the same address, and the present invention would make the system stabilized again on a unique address for all stations that would observe the polling operation. Another example of globally relevant information would be the value of the actual or real time. The invention would keep the actual value of such globally relevant information correct, even if the original station becomes temporarily disturbed and does not know which other station to address for acquiring the correct value.

If the original station broadcasts its own address as a destination address, any other station responding thereto would mean non-unanimity with respect to other stations that would keep mum. This indicates that this address is already assigned to another station and the original station must choose another address In this respect, the situation that all stations had the same address is considered as degenerate. In practice, it will not occur.

The updating may go according to a predetermined pattern. For an address, successive incremental ions by one would be good. Alternatively, updating according to a pseudo-random series would keep two updating stations apart from each other. Especially in a start-up situation where any station may start from a default address -zero-, this would be advantageous: respective stations could then follow respective different sequences.

After updating, the result of the updating may be signalled to any relevant station, either by repeating transmitting a data packet formatted like the original one, but with the now updated information item, or by effectively addressing any station present, for example, by adding destination default address such as -zero-. This procedure keeps other stations abreast of any new developments.

Advantageously, the system comprises a distinguishing device for distinguishing among actual recurrence intervals of respective ones among said stations. Each station could have its own specific recurrence interval. Alternatively, the recurrence interval could be a time-variable quantity in any relevant station.

The invention also relates to a station for use in such communication system. Various advantageous aspects are recited in dependent claims.

BRIEF DESCRIPTION OF THE FIGURES

For a fuller understanding of the invention, reference is attached to the following description taken in connection with the accompanying drawings, in which.

DESCRIPTION OF A PREFERRED EMBODIMENT

General structure of the communication bus system

Figure 1:
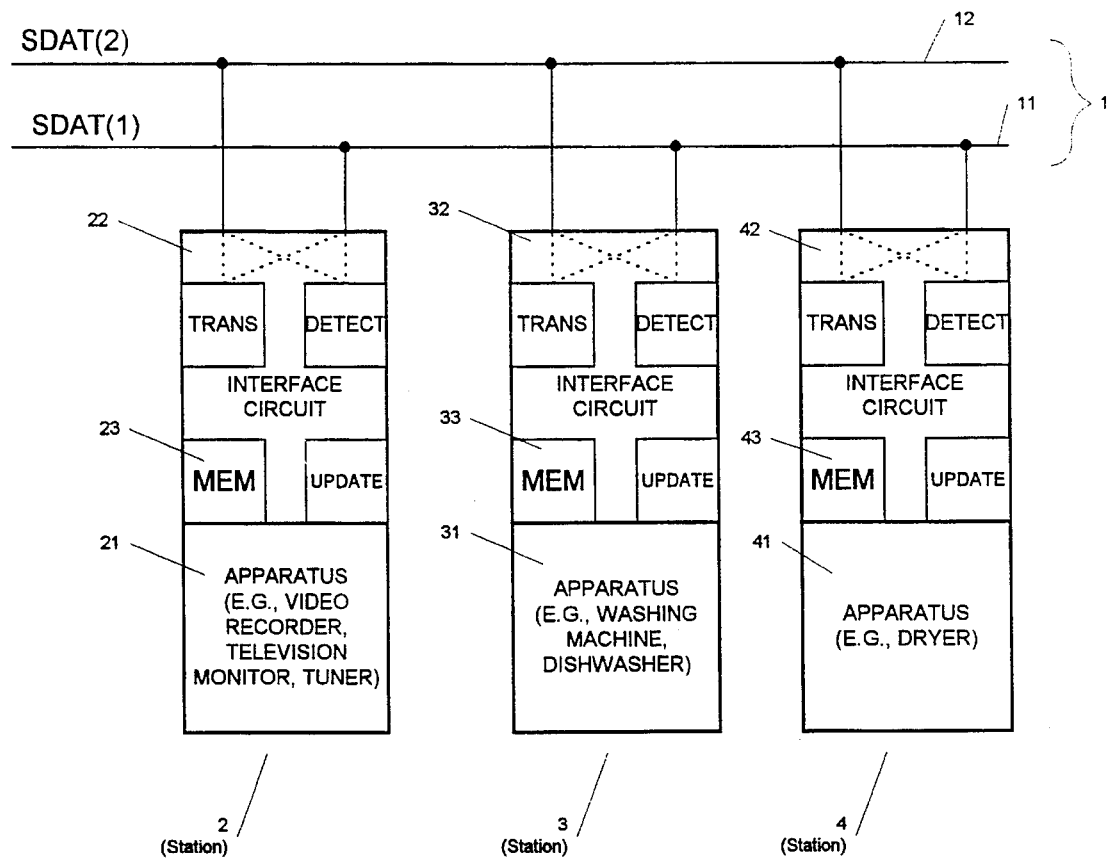
FIG. 1 shows diagrammatically the general structure of a single-channel communication system.

FIG. 1 shows diagrammatically a single-channel communication bus system. It comprises a communication bus 1 consisting of two data lines 11 and 12. In this case three stations 2, 3 and 4 are connected to this communication bus. Each station comprises an apparatus 21, 31, 41 which is connected to the data lines 11 and 12 by means of an interface circuit 22, 32, 42. Such an apparatus may be a TV monitor, a video recorder, an audio recorder, an audio tuner, a controllable set of lighting elements, etcetera. The communication bus is intended to transmit control signals from a first station to a second station. Some stations will act as master stations and others as slave stations. Some stations will act as transmitters of data, some as receivers. All kinds of mixed or alternating situations are possible. The communication operations on the communication bus, which will herein be described, are performed by the interface circuits. A particular advantageous realization of the bus is $D^2B$, c.f. U.S. Pat. No. 4,429,384 that is single channel, twisted pair. The interface circuit may be a MAB 8051 microcontroller, referred to in: Single-Chips 8-Bit Microcontrollers, User manual 1988, Philips Electronic Components and Materials Division; Chapter 3: The MAB 8051/C51/52 microcontroller family; Chapter 11: The $D^2B$ specification. To distinguish the different stations, each interface circuit has a memory location 23, 33, 43 in which a station address is stored. A typical station address comprises twelve bits.

Figure 2A:
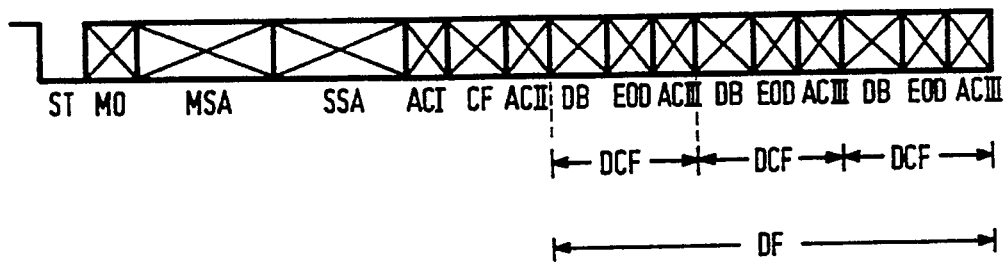
FIG. 2a shows diagrammatically the structure of a communication operation on an information level performed on the communication bus.

The structure of a communication operation on an information level is shown in FIG. 2A. Such an operation starts with a start bit ST. It is followed by a mode field MO in which three mode indication bits are transmitted. They indicate the rate at which the following information will be transmitted. In the master station address field MSA the twelve-bit master station address is transmitted from the station wishing to transmit information to a destination station. The twelve-bit destination station address is transmitted in the destination station address field SSA. If a station recognizes the destination address as its own address, it transmits an acknowledge code in acknowledge code field ACI. If this acknowledge code is not received, it means that the destination station is not present or does not function or that the destination station address is received in a mutilated form. No distinction is made between these three possibilities. In these cases the communication is discontinued after the acknowledge code field. If the acknowledge code has effectively been received, the master station transmits a control code of, for example four bits in control field CF. After reception of this control code, the destination station again transmits an acknowledge code in acknowledge code field ACII. If this second acknowledge code is not received by the master station, the communication is discontinued. If the master station has received this second acknowledge code a data field DF occurs. The data field may be divided into various data or command subfields, each containing a data byte DB, and end of data signalization EOD, and acknowledge bit interval ACIII. Absence of the latter may trigger repeat of the most recent subfield. If EOD is positive, the transmission may terminate.

Figure 2B:
FIG. 2b shows the structure of a station address.

The structure of a station address is shown at FIG. 2B. It comprises a service address SA, a type address TA and a follower address FA. The service address SA comprises, for example four bits and can thus distinguish sixteen services, for example an audio-video service, a washing service, a cooking/baking service etcetera. The type address TA comprises, for example five bits so that thirty-two stations can be distinguished within one service. For example, within the washing service a distinction can be made between a washing machine, a drier, a dish washer, etcetera and within the audio-video service a distinction can be made between a TV monitor, a tuner, a video recorder, etcetera.

In practice the user may have a number of apparatuses of the same type, for example, two or more video recorders. The follower address FA enables him to distinguish between these apparatuses of the same type. By three bits, eight apparatuses of the same type can be distinguished.

The initialization

Now, a station address comprises a service address, a type address and a follower address. The service address and the type address have been assigned by the manufacturer and are programmed in the station address memory of the interface circuit. Programming of the follower address is left to the user and does not take place until after the relevant apparatus has been connected to the communication bus 1 by means of the interface circuit. To this end this interface circuit has an initialization program with the steps shown in FIG. 3 and which is performed as soon as the apparatus is switched on. More particularly the follower address FA is set to zero in a first step 50. Subsequently the start bit ST is set on the communication bus in step 51, the mode bits of the mode field MO in step 52, subsequently the station address MSA of this station is set with FA=0 in step 53 and finally the destination station address SSA of the destination station with which communication is desired is set in step 54. More particularly, the destination station address SSA is made equal to the station address MSA of the master station. Waiting for an acknowledge code takes place in step 55. If this code occurs in the acknowledge code field ACI (so that ACI=1), the follower address is raised by one in step 56 and the steps 51 to 55 are performed again. Whenever an acknowledge code occurs (ACI=1) this means that another station is connected to the communication bus which has the same service address, type address and follower address as the transmitting master station. If no acknowledge code is received, it means that none of the other stations has a station address which corresponds to that of the master station. The last used follower address FA is then stored in the station address memory in a step 57, thus ending the initialization program.

As described in the Reference, a master station does not get access to the communication bus until a so-called arbitration procedure has been formed. In this arbitration procedure the mode indication bits, the service address bits and type address bits and now also the follower address bits are involved.

The updating

Figure 3:
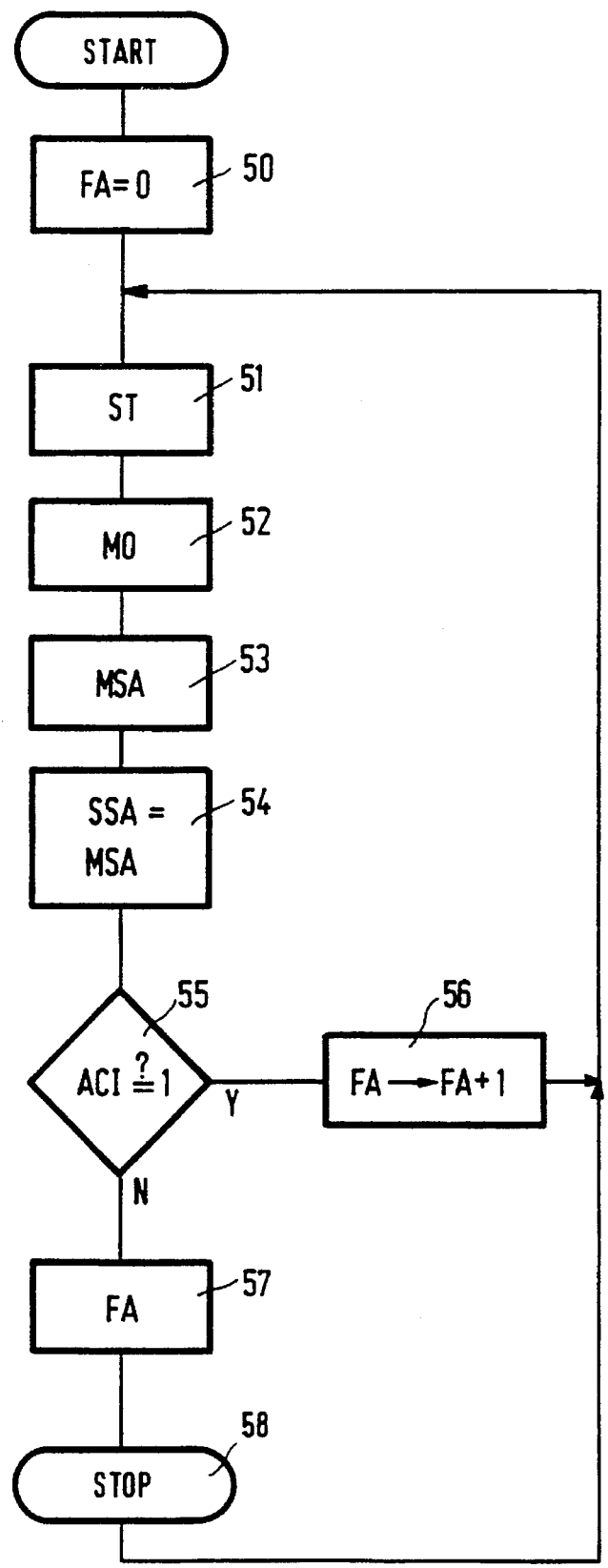
FIG. 3 shows a flow chart for assigning a station address to a station.

In a system according to the invention, the stop block actually starts a particular time-out, after which the system again reverts to block 51, and the same procedure as for initialization ensues. A particular provision, not shown, may be taken in case the loop of FIG. 3 is cycled continuously, indicating no free address is available. For brevity this has not been shown in FIG. 3.

A few assumptions are as follows: first, any unit has a unique code UI or some "random" generator for distinguishing itself from units of the same sort. As almost any unit must contain some NVRAM already, this memory may also contain such code. The randomness of the randomness generator need not be extreme, inasmuch as any system usually contains only a moderate number of stations, say less than 50. Further, as long as a unit has not gained an address definitely, that is, when the unit has not yet decided which address to take, it may not respond to packets destined to its provisional address. Now, at the end of the time-out, the station leaves block 58 for block 51. Each station may have its own time-out value, or a time-out value that is randomized among successive passages through block 58. Also, the incrementing by 1 occurring in block 56 may be changed into a quasi-randomized sequence of proposed station addresses. A suitable solution is by a maximum-length retrocoupled shift register because this couples the quasi randomness with the property that all addresses will be actually passed.

Now, each unit will not try to get a unanimous counter signalization very not often. A right percentage is that overall load is at most 5%. On the other hand, user granularity must feel little influence of an incorrect addresses. It is felt that an incorrect address should not exist for more than one minute in a home system. This could mean that the time-out should be a fraction of a minute.

Particular globally relevant informations would be:
the particular station's opinion of the content of other station's information, cf. the global real time referred to supra
the wish to use a particular resource. Normally, the resource itself (peripheral, bus transport facility) is interrogated directly, but the present solution allows for a more abstract or ephemeral wish, without specifying the object itself.

We claim:

1. A communication system having multiple and uniformly weighted stations interconnected by a shared digital bus, wherein no single station acts as overall controller of bus interactions, characterized in that a particular station comprises:

a) transmitting means for recurrently transmitting on the digital bus a data packet, representing an information item globally relevant to the other stations of the system, with a predetermined maximum recurrence interval between recurring transmissions of the data packet;

b) detecting means for detecting counter signalizations by a subset of the other stations; and c) updating means for changing the information item in response to a non-unanimous counter signalization from the subset of other stations, and wherein the counter signalization of each station is one of (i) a response by a station and (ii) no response by a station, and the non-unanimous counter signalization for a transmitted data packet is one of i) a response from less than all of the stations of the subset when all of the stations of the subset should have responded to the transmission of the data packet and ii) a response from a station of the subset when none of the stations of the subset should have responded to the transmission of the data packet.

2. The communication system as claimed in claim 1, wherein the non-unanimous counter signalization for a transmitted data packet is a response from at least one of the stations of the subset which response is different than other responses from other stations of the subset.

3. The communication system as claimed in claim 1, wherein after the information is changed by said updating means, the transmitting means transmits to the other stations on the digital bus a data packet representing the changed information item.

4. The communication system as claimed in claim 1, wherein each station including transmitting means transmits the data packets such that the predetermined maximum recurrence intervals of each station are different and the system further includes distinguishing means for distinguishing between the predetermined maximum recurrence intervals of each station.

5. A communication system as claimed in claim 1, wherein the digital bus carries at any time only a single datum.

6. A communication system as claimed in claim 1, configured as a home-based system wherein a plurality of the stations are each comprised by one of a television monitor, a tuner, a video recorder, a washing machine, a drier and a dishwasher.

7. A communication system as claimed in claim 1, wherein said updating means changes the information item according to a predetermined updating pattern.

8. The communication system as claimed in claim 1, wherein the information item is a proposed address of a station.

9. The communication system as claimed in claim 8, wherein the data packet contains the proposed address as a destination address and the detection means detects unanimous counter signalization as no response from any station of the subset.

10. The communication system as claimed in claim 8, wherein the non-unanimous counter signalization is a response from a station of the subset having an address equivalent to the proposed address.

11. A station interfaceable to a communication system having multiple and uniformly weighted stations interconnected by a shared digital bus wherein no single station present acts as overall controller of bus interactions, comprising:

a) transmitting means for recurrently transmitting on the digital bus a data packet, representing an information item globally relevant to the other stations of the system, with a predetermined maximum recurrence interval between recurring transmissions of the data packet;

b) detecting means for detecting unanimous counter from a subset of the other stations of the system; and c) updating means for changing the information item in response to a non-unanimous counter signalization from the subset of other stations, and wherein the counter signalization of each station is one of (i) a response by a station and (ii) no response by a station, and wherein the non-unanimous counter signalization for a transmitted data packet is one of i) a response from less than all of the stations of the subset when all of the stations of the subset should have responded to the transmission of the data packet and ii) a response from a station of the subset when none of the stations of the subset should have responded to the transmission of the data packet.

12. The station as claimed in claim 11, wherein the information item is a proposed address of the station transmitting the data packet and the non-unanimous counter signalization is a response from any station having an address equivalent to the proposed address.

13. The station as claimed in claim 12, wherein after the information item is changed by said updating means the transmitting means transmits to the other stations a data packet representing the changed information item.

14. The station as claimed in claim 11, wherein the non-unanimous counter signalization is a response from at least one station of the subset but not all of the stations of the subset.

15. The station as claimed in claim 11, wherein after the information item is changed by said updating means the transmitting means transmits to the other stations a data packet representing the changed information item.

16. The station as claimed in claim 11, further including means for distinguishing the predetermined time intervals of each station of the communication system to which said stations are interfaced.

17. A station as claimed in claim 11, wherein the updating means changes the information item according to a predetermined updating pattern.

18. A method of communicating in a system having multiple and uniformly weighted stations interconnected by a shared digital bus, wherein no single station acts as overall controller of bus interactions, including the steps of:

recurrently transmitting on the digital bus a data packet, representing an information item globally relevant to other stations of the system, with a predetermined maximum recurrence interval between recurring transmissions of the data packet;

detecting counter signalizations by a subset of the other stations; and changing the information item in response to a non-unanimous counter signalization from the subset of other stations, and wherein the counter signalization of each station is one of (i) a response by a station and (ii) no response by a station and wherein the non-unanimous counter signalization for a transmitted data packet is one of (i) a response from less than all of the stations of the subset when all of the stations of the subset should have responded to the transmission of the data packet and ii) a response from a station of the subset when none of the stations of the subset should have responded to the transmission of the data packet.

19. The method as claimed in claim 18, wherein the step of transmitting transmits a proposed address and all stations having the proposed address transmit a response and if no station transmits a response the step of detecting detects a unanimous counter signalization which indicates the proposed address is an unused address, and if a response is transmitted by a station then the steps of changing the information and the steps of transmitting the information item are repeated such that new addresses are transmitted until the step of detecting detects a unanimous counter signalization.

20. The method as claimed in claim 18, wherein the steps of changing, transmitting and detecting are repeated until a unanimous counter signalization is detected.

* * * * *